Patented Dec. 8, 1936

2,063,589

UNITED STATES PATENT OFFICE 2,063,589

WATER-INSOLUBLE AZO DYES AND THEIR PRODUCTION

Miles Augustinus Dahlen, Wilmington, Del., and Martin Edwin Friedrich, Carneys Point, N. J., assignors to E. I. du Pont de Nemours & Company, Wilmington, Del., a corporation of Delaware No Drawing. Application January 11, 1935, Serial No. 1,316

10 Claims.  (Cl. 260—95)

This invention relates to azo colors which are useful as pigments or as dyestuffs for textile fibers, to methods of preparing them, and to new intermediates.

It is an object of the invention to prepare new water-insoluble azo colors in the form of dyes or pigments. Another object of the invention is to make new intermediates useful in the manufacture of azo colors. Yet another object of the invention is to employ the new intermediates in the manufacture of azo colors.

The objects of the invention are accomplished, generally speaking, as follows: The new colors are prepared by coupling a diazotized primary arylamine to a compound having the formula:

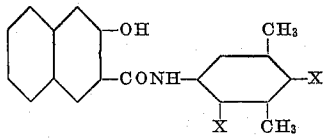

in which the hydrogen of position X may be replaced by halogen. Dyeing, for instance dyeing a fiber, may be carried out by developing the color on the fiber in one of the several ways known to prior art.

If the preparation of a water-insoluble pigment is desired, one may be prepared by coupling one of the new intermediates to a diazotized primary arylamine in solution. For instance, the intermediate may be dissolved in an alkaline, aqueous alcohol solution. A second solution containing the diazotized arylamine is then mixed with the solution containing the new intermediate and the precipitated pigment is filtered and purified.

If the preparation of a colored material is desired, one of several methods may be employed: (1) By methods known in the art the material, for instance a fabric, is impregnated with the new intermediate and is immersed in a solution containing a diazotized arylamine. (2) The fabric may be impregnated with the new intermediate and may thereafter be treated with a paste containing a diazotized arylamine, usually in the form of its salt. After this treatment the fabric may be washed to remove the arylamide from the undeveloped portions of the fabric. (3) A printing paste may be made up according to methods known in the art containing one of the new intermediates and including an arylamine stabilized according to methods known in the prior art. The fabric may be subjected to the action of heat and weak acids. Coupling takes place on the fiber and the paste may be removed by appropriate treatment. (4) A printing paste may be prepared containing one of the new intermediates, an antidiazotate, and the usual assistants. The textiles printed with such pastes may be treated with weak acids. The coupling takes place on the fiber.

The following formula represents the reaction which takes place in the formation of pigments or dyes

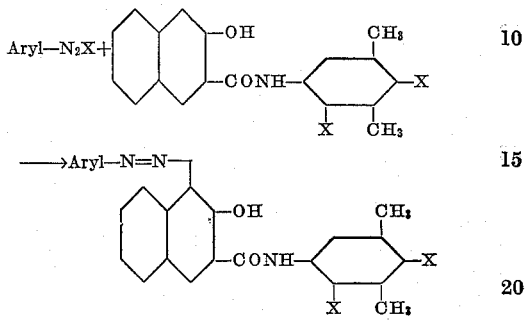

In this expression X means that the hydrogen in this position may be replaced by halogen and Aryl represents an aryl nucleus of the benzene, diphenyl, naphthalene, diphenylamine, diphenylether, azobenzene, anthraquinone or carbazole series which contain no s-auxochromes, but which may contain n-auxochromes. The auxochromes are substituents which may replace hydrogen on an aryl nucleus and which change but do not originate the color of the dyestuff. They form a recognized class, divided into two groups, of which the one tends to make dyestuff water-soluble and the other does not. In this specification those auxochrome groups which tend to make dyestuff water-soluble (the carboxylic and sulfonic acid groups) are called "s-auxochromes", and those which do not (the radicals such as alkyl, alkoxy, aryloxy, aralkyl, aralkoxy, aryl, hydroaryloxy, trifluoromethyl, halogen, and nitrogen) are called "n-auxochromes".

Exemplary of the large number of primary arylamines which may be employed in the formation of dyestuffs of the kind herein described are the following: 4-nitro-2-amino-anisole; 2,5-dichlor-aniline; 4-chloro-2-amino-toluene; 2-methoxy-1-naphthylamine; 2-methoxy-aniline; 2-phenoxy-aniline; 2-ethoxy-aniline; 2-chlor-5-methyl-amine; 2-methyl-aniline; 2-methoxy-5-methyl-aniline; 2-methoxy-4-chlor-5-methyl-aniline; 2,5-dimethoxy-aniline; 2,5-diethoxy-aniline; 2,5-dimethoxy-4-chlor-aniline; 5-brom-2-methoxy-aniline; 3-iodo-6-methoxy-aniline; 3-iodo-6-ethoxy-aniline; 3-methyl-4-chlor-aniline;

3-brom-6-ethoxy-aniline; 3-chlor-6-ethoxy-aniline; 3-ethoxy-aniline; 3-phenoxy-aniline; 3-methoxy-aniline; 3-brom-6-phenoxy-aniline; 3-iodo-6-phenoxy-aniline; 3-brom-6-methyl-aniline; 3-chlor-6-methyl-aniline; 3-methyl-aniline; 3-brom-5-methyl-aniline; 3-chlor-6-phenoxy-aniline; 2,5-dimethyl-4-chlor-aniline; 4-ethyl-aniline; 4-amino-benzotrifluoride; 4-chlor-2-methoxy-aniline; 4-brom-2-methoxy-aniline; 4-brom-2-ethoxy-aniline; 4-iodo-2-methoxy-aniline; 4-methoxy-aniline; 4-chlor-2-ethoxy-aniline; 4-phenoxy-aniline; 4-ethoxy-aniline; 4-brom-2-phenoxy-aniline; 4-methoxy-2-chlor-aniline; 4-chlor-2-methyl-aniline; 4-methyl-3-brom-aniline; 4-brom-3-methyl-aniline; 4-methyl-3-chlor-aniline; 4-methyl-aniline; 4-chlor-2-phenoxy-aniline; 4-methoxy-3-chlor-aniline; 4-phenoxy-2-chlor-aniline; 4-chlor-2,5-diethoxy-aniline; 3-chlor-2-methyl-aniline; 3-chlor-2-methoxy-aniline; alpha-naphthylamine; beta-naphthylamine; ortho-chlor-aniline; meta-chlor-aniline; meta-nitraniline; 4-chloro-2-nitraniline; 4-chloro-2-amino-anisole; 5-nitro-2-amino-anisole; 1-amino-4-benzoyl-amino-2,5-diethoxy-benzene; N-(para-amino-benzoyl)-aniline; dianisidine; alpha-amino-anthraquinone; 3-amino-carbazole; 2-nitro-4-methyl-benzene-azo-cresidine; 4,4'-diamino-diphenylamine.

The following examples illustrate but do not limit the invention:

*Example I*

A sym-xylidide of 2,3-hydroxy-naphthoic acid was prepared as follows: 40 parts of 2,3-hydroxy-naphthoic acid, 433 parts of toluene, and 25 parts of 3,5-dimethyl-aniline were heated to 50° C. and 13.0 parts of phosphorus trichloride were added. The mixture was refluxed and agitated for 18 hours. The charge was made alkaline by soda ash. The toluene was removed by direct and steam distillation and the 3,5-dimethyl-anilide of 2,3-hydroxy-naphthoic acid was isolated by filtration, dried, and ground. The product was a white powder. The yield was 90% of theory.

*Example II*

A solution of 2,3-hydroxy-naphthoyl-3,5-dimethyl-aniline was prepared in the following manner: 8 parts of 2,3-hydroxy-naphthoyl-3,5-dimethyl-aniline were mixed with 12 parts of alcohol and 12 parts of caustic soda and, after complete solution was effected, 2 parts of butylated-naphthalene-beta-sulfonic acid were added and then water until a volume of 1000 parts was obtained. 40 parts of cotton piece goods were impregnated with this solution, wrung out, and without rinsing or drying were developed in a solution of the diazo salt of 4-nitro-2-amino-anisole which was prepared as follows:

16.8 parts of 4-nitro-2-amino anisole were dissolved in a mixture of
200.0 parts of hot water and
26.0 parts of hydrochloric acid of 22° Bé. The solution was cooled with
150.0 parts of ice, and the diazotization was carried out with
7.2 parts of sodium nitrite dissolved in
50.0 parts of water. Just before coupling, the excess mineral acidity was neutralized with sodium acetate.

The developed goods was rinsed, soaped at the boil, again rinsed, and dried. A bright red dye, having the properties described in No. 6 in the table below, was obtained. It has the formula:

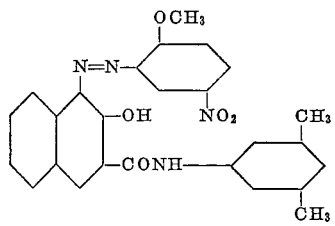

*Example III*

A padding solution was made up as follows: 8.0 parts of the 2,3-hydroxy-naphthoyl derivative of 3,5-dimethyl-aniline were pasted up with about 10 parts of alcohol, and 4.0 parts of caustic soda of 30% strength were added. When complete solution was effected, water was added until a total volume of 1000 parts was obtained.

40 parts of well washed and dried yarn were impregnated with this solution, wrung out, dried, and developed in a solution of the diazo salt of 4-chlor-2-amino-toluene which was made up in the following manner:

17.5 parts of the base were dissolved in a mixture of
18.0 parts of hydrochloric acid and 200 parts of boiling water.
150.0 parts of ice were added, followed by a solution of
7.2 parts of sodium nitrite in 50 parts of water.

A bluish-scarlet dyeing having very food fastness to light and kier boiling, good fastness to the laundry test, and also to the chlorine test, although somewhat weaker is obtained. The dye has the formula:

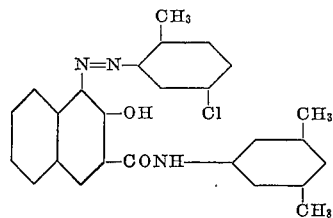

*Example IV*

Cotton piece goods were impregnated with the 2,3-hydroxy-naphthoyl derivative of 3,5-dimethyl-aniline, which was prepared in solution as described in Example II. The impregnated goods were wrung out and developed in a solution of the diazo salt of alpha-amino-anthraquinone, which was prepared as follows:

22.3 parts of alpha-amino-anthraquinone were dissolved in
223.0 parts of sulfuric acid (66° Bé.) and the solution was cooled (with external cooling) to 5–10° C.
7.2 parts of solid sodium nitrite were added slowly, maintaining the temperature at 15–18° C. The solution was agitated for about an hour, letting the temperature rise to about 35° C. When the diazotization was complete the solution was poured onto ice, and the solid diazo salt was filtered. The diazo salt was washed with sodium sulfate solution until it was free of acid and was dissolved in
500.0 parts of water at 25–30° C.

The developed goods were rinsed, soaped at the boil, again rinsed, and dried. In this manner a red dye having the properties described in No. 13 in the table below is obtained. It has the formula:

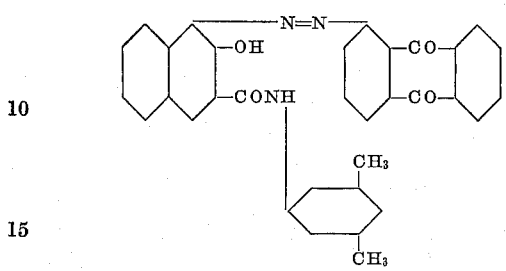

*Example V*

A padding solution was made up using 8.0 parts of the 2,3-hydroxy-naphthoyl derivative of 2-chlor-3,5-dimethyl-aniline, 10 parts of Turkey red oil and 12 parts of caustic soda (34° Bé.), and water to make a total volume of 1000 parts. 40 parts of well washed and dried skeins were impregnated in the above solution, wrung out and developed in a solution of the diazo salt of 4,4'-diamino-diphenylamine, which was prepared in the following manner:

4 parts of the base were pasted up with 20 parts of hot water. The paste was cooled, and 50 parts of cold water, 20 parts of ice, and 11 parts of hydrochloric acid (20° Bé.) were added. The diazotization was carried out by adding a solution of 3 parts of sodium nitrite in 5 parts of water. When the diazotization was finished the solution was filtered, neutralized with chalk, and 5 parts of magnesium sulfate were added.

A bluish-black dyeing having good fastness to light, very good fastness to kier boiling and to kier boiling followed by a chlorine treatment, good fastness to the laundry test, and good fastness to the bleach test was obtained. The formula of the dye is as follows:

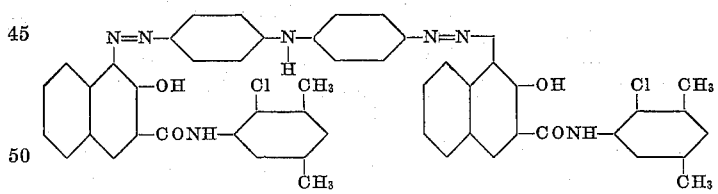

*Example VI*

Cotton piece goods were impregnated with a solution of the 2,3-hydroxy-naphthoyl derivative of 2-chlor-3,5-dimethyl-aniline, which was prepared as described in Example V above. The impregnated goods were wrung out, and developed in a solution of the diazo salt of m-nitro-p-toluidine, which was prepared as follows:

15.2 parts of 3-nitro-4-amino toluene were pasted up in
37.5 parts of water
30.0 parts of hydrochloric acid of 37% strength were added slowly, and the whole mass agitated about half an hour. The charge was externally cooled to about 10° C. and the diazotization was carried out with
7.0 parts of sodium nitrite dissolved in
20.0 parts of water. When the diazotization was finished, the solution was filtered and the excess mineral acidity neutralized with sodium acetate.

The developed piece goods were rinsed, soaped at the boil, again rinsed, and dried. In this manner, a bright red dyeing having the properties described in No. 17 in the table below was obtained. The color has the formula:

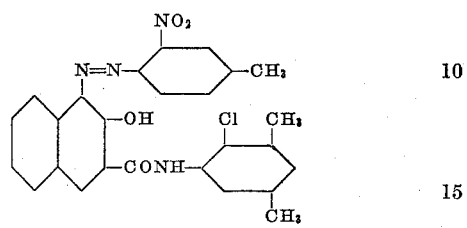

*Example VII*

42.6 parts of 4-chlor-2-amino-toluene were diazotized at 5–10° C. in a solution containing 250 parts of water and ice, 21.0 parts of sodium nitrite, and 76 parts of hydrochloric acid (37%). The solution of the diazo salt was clarified and added to a solution of 43 parts of pipecolinic acid (M. W. 129) in 450 parts of water. The mixture was held alkaline to phenolphthalein by the addition of soda ash. When the test for the diazo salt had disappeared, the solution was heated to 40° C., filtered, and the filtrate salted until the diazo amino compound was separated completely (15% by volume salt). The oil was dried in a vacuum oven at 65° C. About 82 g. of solid was obtained.

3.0 parts of the above powder were worked up into a paste containing 3.8 parts of the 2,3-hydroxy-naphthoyl derivative from 3,5-dimethyl-2-chloraniline, 3 parts of caustic soda (40° Bé.), 65 parts of starch-tragacanth thickener and 25.2 parts of water.

Cotton goods were printed with the paste, from a copper roll, the goods were dried, and were developed in an acetic acid ager. The material was soaped at the boil, rinsed, and dried. A bluish-red dyeing was obtained. The dye has the formula:

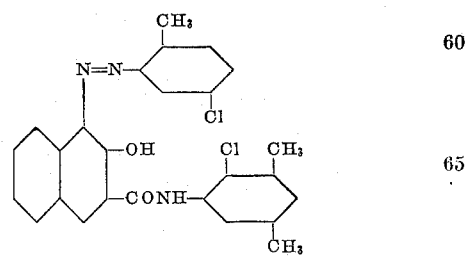

*Example VIII*

The nitrosamine from 2,5-dichloraniline was prepared as described in United States Patent 531,975 was purified by recrystallization from a small amount of hot water, and was dried in a vacuum oven at 50° C. It had a purity of 87% (mol. wt. 213).

2.5 parts of the nitrosamine and 3.4 parts of the 2,3-hydroxy-naphthoyl derivative of 3,5-dimethyl-2-chlor-aniline were dissolved in a mixture of 6 parts of cellosolve and 2 parts of caustic soda (34° Bé.). 21 parts of water were added and when the mixture was well mixed 65 parts of starch-gum-tragacanth solution were admixed. The thickened paste was printed on bleached cotton from a copper roll, the goods dried, aged for one and one quarter minutes in an acetic acid ager, rinsed, soaped, again rinsed and dried. A bluish-scarlet dyeing, having excellent fastness to the five-minute soaping test was obtained. The light and chlorine fastness tests concentrated sulfuric acid, a violet color which changed to pink on dilution with water was produced. The formula of the dye is:

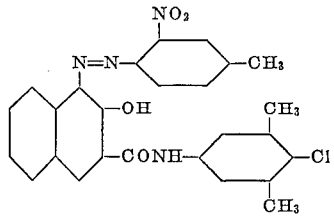

Examples of other good combinations of diazotized arylamines with a 2,3-hydroxy-naphthoyl derivative of 3,5-dimethyl-aniline are shown in the following list which is exemplary, not exhaustive.

| No. | 2,3-Hydroxy-Naphthoyl derivative of | Base | Shade | Light | 1/2° Bé. chlorine | Kier boil | Kier boil +2° Bé. chlorine | Nafal label laundry test |
|---|---|---|---|---|---|---|---|---|
| 1 | 3,5-dimethyl-aniline. | m-Chloraniline | Orange | Good | | | | |
| 2 | do | 5-nitro-2-amino-anisole | Bluish-red | Good | Good | Poor | Fair | Good. |
| 3 | do | m-Nitro-p-toluidine | Red | Fair | Fair | | | |
| 4 | do | p-Chlor-o-nitro-aniline | Red | Good | Good | | | |
| 5 | do | 2,5-dichlor-aniline | Scarlet | Fair | Good | | | |
| 6 | do | 4-nitro-2-amino-anisole | Red | Fair | Good | Good | Good | Very good. |
| 7 | do | 4,4'-diamino-diphenylamine | Black | Very good | Very good | Very good | Very good | Very good. |
| 8 | do | 1-amino-4-benzoyl-amino-2,5-diethoxy-benzene. | Navy blue | Very good | Very good | Good | Good | Very good. |
| 9 | do | p-Chlor-o-toluidine | Red | Very good | Very good | Very good | Very good | Very good. |
| 10 | do | p-Chlor-o-anisidine | Bluish-red | Very good | Good | Good | Good | Very good. |
| 11 | do | m-Nitro-p-anisidine | Red | Very good | Good | Fair | Poor | Very good. |
| 12 | do | m-Nitraniline | Yellowish-red | Very good | Very good | Fair | Poor | Very good. |
| 13 | do | a-Amino-anthraquinone | Red | Very good | Good | Fair | Poor | Very good. |
| 14 | 3,5-dimethyl-2-chlor-aniline. | m-Chloraniline | Orange | Good | Good | Fair | Fair | Good. |
| 15 | do | 2,5-dichloraniline | Scarlet | Good | Good | Good | Good | Good. |
| 16 | do | 4-nitro-2-amino-anisole | Yellowish-red | Fair | Very good | Good | Good | Good. |
| 17 | do | m-Nitro-p-toluidine | Bluish-red | Very good | Good | Good | Good | Good. |
| 18 | do | p-Chlor-o-toluidine | Red | Very good | Very good | Good | Good | Very good. |
| 19 | do | 5-nitro-2-amino-anisole | Bluish-red | Poor | Good | Good | Good | |
| 20 | do | 4,4'-diamino-diphenylamine | Greenish-black | Very good | Very good | Very good | Good | Good. |
| 21 | do | 1-amino-4-benzoyl-amino-2,5-diethoxy-benzene. | Navy blue | Good | Very good | Good | Fair | Good. |
| 22 | 3,5-dimethyl-4-chlor-aniline. | m-Chloraniline | Orange | Fair to good. | Good | | | |
| 23 | do | 2,5-dichloraniline | Scarlet | Fair to good. | Fair to good. | | | |
| 24 | do | 4-chlor-o-anisidine | Bright red | Fair | Very good | | | |
| 25 | do | 4-chlor-o-nitraniline | Red | Fair | Good | | | |
| 26 | do | m-Nitro-p-toluidine | Dull red | Fair | Good | | | |
| 27 | do | 5-chlor-o-toluidine | Orange | Fair to good. | Good | | | |
| 28 | do | 1-amino-4-benzoyl-amino-2,5-diethoxy-benzene. | Blue | Fair to good. | Good | | | |
| 29 | do | 4,4'-diamino-diphenyl-amine | Dull blue | Fair | Fair | | | | were also satisfactory. The dye has the formula:

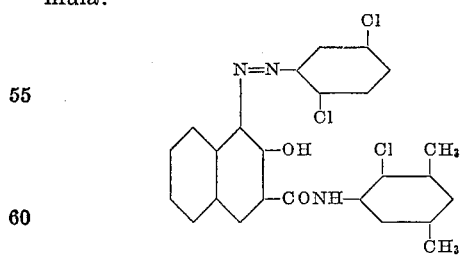

*Example IX*

2 parts of the 2,3-hydroxy-naphthoyl derivative of 3,5-dimethyl-4-chloraniline were dissolved in a mixture of 4 parts of alcohol and 4 parts of caustic soda of 30% strength, and 100 parts of water were added. To the solution of the coupling component the diazo salt prepared from 1.25 parts of 3-nitro-4-amino-toluene neutralized with sodium acetate was added.

The bluish-red pigment was filtered, washed thoroughly with water and ethyl alcohol, and recrystallized from nitro benzene, when it melted at 319–320° C. When the dye was dissolved in The diazo components may be converted to water-soluble diazo-imino derivatives by the use of various stabilizing agents. In addition to the piperidine-alpha-carboxylic acid disclosed in Example VII a number of these agents is known to the art and all of them may be used under proper circumstances in connection with this invention. Among them may be named sarcosine, 4-sulfo-2-amino-benzoic acid, proline, and methyl-glucamine.

The new intermediates may be used for the preparation of excellent colors. The new colors may be used as pigments or as dyes. As pigments they may be incorporated in printing inks, lacquers, paints, and the like. As dyes they may be applied to textile fibers and the like. These dyes are particularly applicable to substances such as cellulose, regenerated cellulose, and the like.

Advantages of the invention other than those hereinabove set forth are the preparation of new intermediates and new dyestuffs which have excellent properties and wide utility.

As many apparently widely different embodiments of this invention may be made without departing from the spirit and scope thereof, it

We claim:
1. An azo dyestuff represented by the formula:

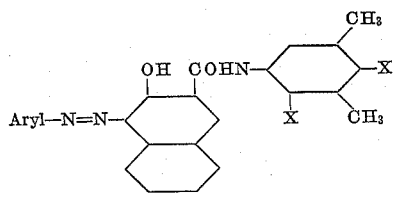

in which X is one of a group consisting of hydrogen and halogen.

2. An azo dyestuff represented by the formula:

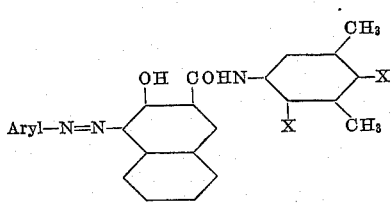

in which X is one of a group consisting of hydrogen and halogen, and the dyestuff is free from water-solubilizing substituents.

3. An azo dyestuff represented by the formula:

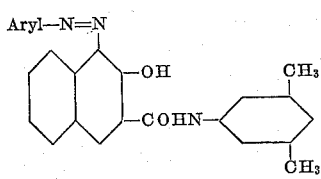

which is free from water-solubilizing substituents, and in which the xylidino radical is halogenated.

4. An azo dyestuff represented by the formula:

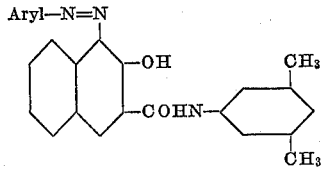

which is free from water-solubilizing substituents, and in which the xylidino radical is chlorinated.

5. An azo dyestuff represented by the formula:

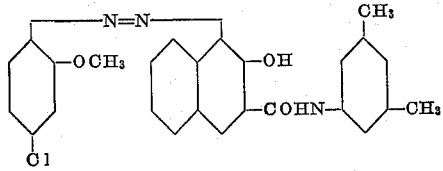

6. An azo dyestuff represented by the formula:

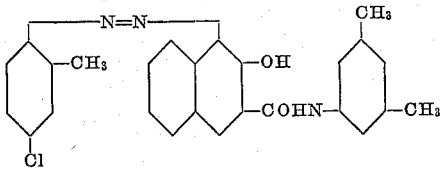

7. The method of making a water-insoluble color which comprises coupling a diazotized primary arylamine to a chlorinated 3,5-dimethyl-anilide of 2,3-hydroxy-naphthoic acid.

8. The method of making a water-insoluble color which comprises coupling a diazotized primary arylamine to a 3,5-dimethyl-anilide of 2,3-hydroxy-naphthoic acid.

9. The method of making a color which comprises diazotizing para-chlor-ortho-anisidine and coupling it to 2,3-hydroxy-naphthoyl-3,5-dimethyl-aniline.

10. The method of making a color which comprises diazotizing para-chlor-ortho-toluidine and coupling it to 2,3-hydroxy-naphthoyl-3,5-dimethyl-aniline.

MILES AUGUSTINUS DAHLEN.
MARTIN EDWIN FRIEDRICH.

CERTIFICATE OF CORRECTION.

Patent No. 2,063,589.

December 8, 1936.

MILES AUGUSTINUS DAHLEN, ET AL.

It is hereby certified that error appears in the printed specification of the above numbered patent requiring correction as follows: Page 1, first column, beginning with the word "make" in line 8, strike out all to and including the word "colors" in line 11, and insert instead use the new azo colors as pigments or to dye various materials. Other objects of the invention will be obvious or elsewhere herein set forth; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.